Feb. 5, 1935.  T. O'N. CARTNER  1,990,115
HEAD LAMP FOR MOTOR VEHICLES
Filed April 7, 1934
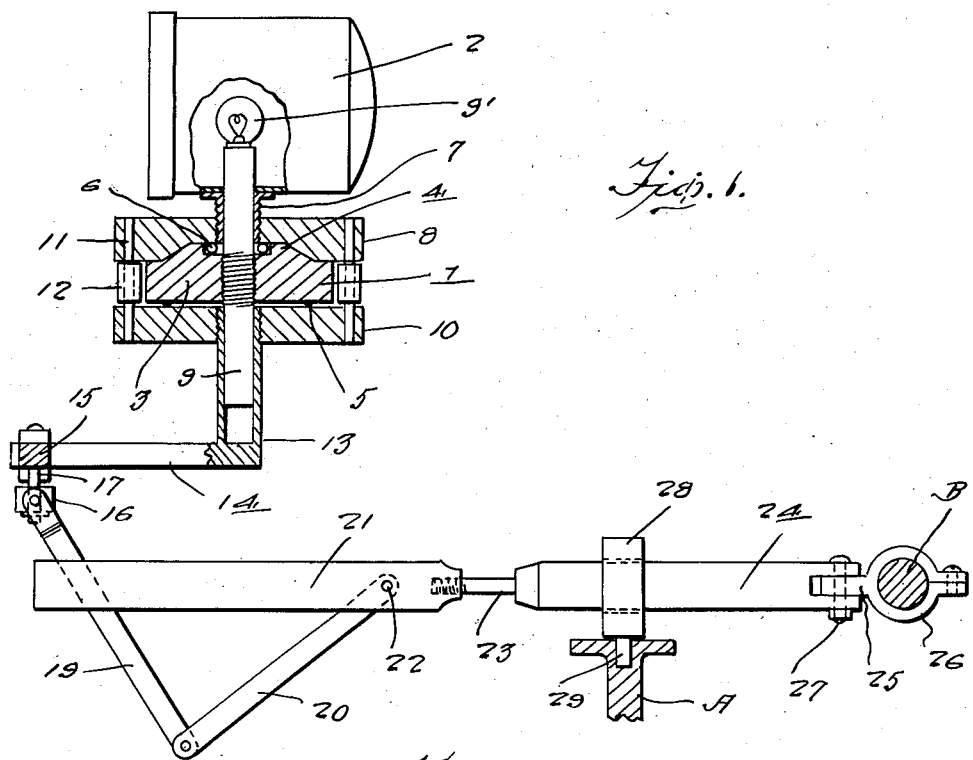
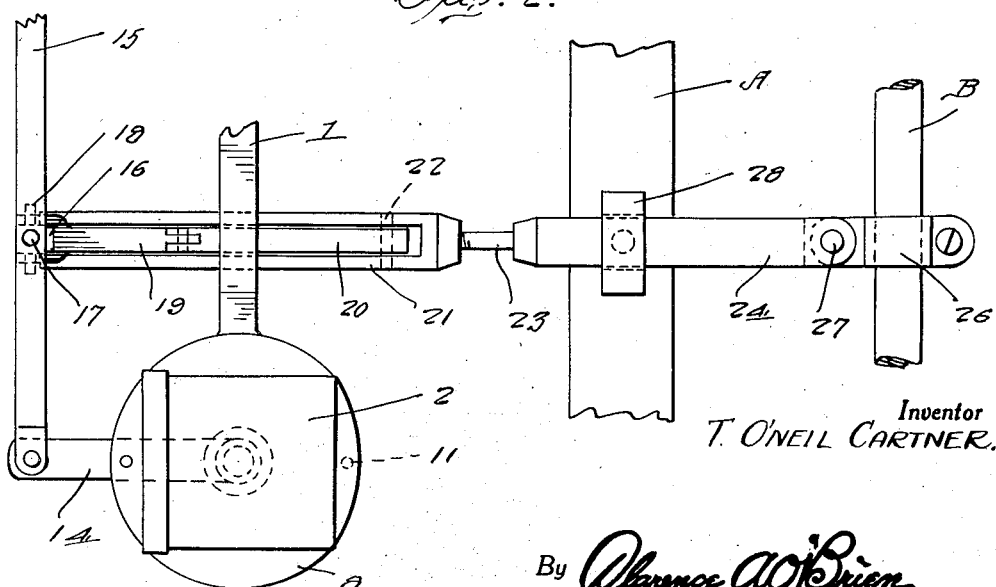
Inventor
T. O'NEIL CARTNER.
By Clarence A. O'Brien
Attorney Patented Feb. 5, 1935

1,990,115

UNITED STATES PATENT OFFICE 1,990,115

HEAD LAMP FOR MOTOR VEHICLES

Thomas O'Neil Cartner, Detroit, Mich.

Application April 7, 1934, Serial No. 719,556

1 Claim. (Cl. 240—62.72)

This invention relates to headlamps for motor vehicles, the general object of the invention being to provide simple means for rotatably supporting the headlamps and simple means for transmitting the motion of the steering mechanism radius rod to said headlamps whereby the rays of light will illuminate the road on curves, as well as on straight portions thereof.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a side view, partly in section, of the invention.

Figure 2 is a top plan view of Figure 1.

In this drawing, the letter A indicates the front axle of the motor vehicle and the letter B indicates the rod which connects the steering arms of the steering wheels or front wheels of the vehicle together. In carrying out the invention, I provide a bar 1 which extends across the front of the vehicle and the front of the radiator and may have its ends connected to the fenders or this bar can be otherwise supported and under each headlamp 2 the bar is formed with a circular part 3 which has a substantially frusto-conical portion on its upper face and an annular V-shaped rib 5 on its under face. The top part of the frusto-conical portion 4 is recessed to receive the anti-friction bearings 6 and a sleeve 7 is threaded in the centrally arranged opening in an upper circular member 8 which has a frusto-conical recess in its under face for receiving the frusto-conical part 4 of the circular part 3. The upper end of the sleeve 7 is flanged and this flange is attached to the under part of the lamp casing 2. The circular part 3 has a threaded centrally arranged opening therein for receiving the threaded part of a tube 9, the unthreaded upper portion of which passes through the sleeve into the casing 2 and has a socket at its upper end for receiving the lamp bulb 9'. A second circular member or plate 10 has its upper face bearing against the rib 5 and the two members 8 and 10 are fastened together in spaced relation by the bolts or rivets 11, each of which is provided with a spacer 12, as shown in Figure 1. A tubular part 13 projects upwardly from an arm 14 and this tubular part is threaded in a centrally arranged opening in the member 10 and receives the lower unthreaded portion of the tube 9.

Thus the tube 9 is held against movement in the circular part of the bar 1, while the members 8 and 10 can rotate partially on the circular portion and around the tube and partial rotary movement of the member 8 is communicated to the lamp casing through the sleeve 7, while partial turning movement of the part 13 and the arm 14 is communicated to the member 10 and this movement is imparted to the member 8 by means of the bolts or rivets 11. Thus when the arm 14 is oscillated, the lamp casing 2 is also oscillated.

A bar 15 has its ends pivoted to the arms 14 of the two lamps and a block 16 is swiveled to a part of the bar 15 by a bolt 17, the block being attached to the lower end of the bolt which extends below the bar 15. This block has the oppositely extending trunnions 18 extending therefrom which pass through openings formed in the prongs of the forked end of a link 19, the lower end of the link being pivotally connected to a second link 20, these links passing between the long prongs of a bar 21, with the rear end of the link 20 pivoted to the prongs adjacent their rear ends, as shown at 22. The rear end of this bar 21 has a threaded socket therein for receiving the threaded part of the reduced portion 23 of a bar 24, the rear end of which is forked to receive the ear 25 on a clamping ring 26 which is clamped to the connecting rod B. The rear forked end of the bar 24 is pivoted to the ear, as shown at 27. A ring 28 is swiveled to the top part of the front axle A, as shown at 29, and the bar 24 passes through said ring. By providing the threaded connections between the members 21 and 24, the horizontal member formed by said two members can have its length adjusted.

Thus it will be seen that as the connecting bar or rod B is shifted with the steering movement of the vehicle, a rocking movement is imparted to the bar 24 and also to the bar 21 and as the links 19 and 20 pass through the space formed by the prongs of this bar 21, movement is communicated to said links, which results in a longitudinal movement to the bar 15 which is connected to the arms 14 of the two headlamps and thus the lamps are turned to direct the light rays upon a curved portion of the road which the vehicle is approaching. As soon as the turn is made, the parts are returned to their normal positions so that the lamps will direct their rays of light straight ahead. This arrangement will permit the parts to adjust themselves to the relative movement between the chassis of the vehicle and the body or between the body and the axle A.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

In combination with an axle and a connecting rod of a vehicle, a ring swiveled to the axle, a horizontal elongated member adjustable as to its length passing through the ring and having its rear end pivotally connected with the connecting rod, the front end of said member being forked, a link having its rear end pivoted between the prongs of the fork, said link extending downwardly and forwardly a second link having one end connected with the front end of the first link and said second link passing upwardly and forwardly between the prongs of the fork, a cross bar, a universal joint between the second link and said cross bar, a pair of rotary members, supporting means for the same, arms extending from said rotary members and connected with the bar, and lamps connected with the rotary members.

THOMAS O'NEIL CARTNER.